(12) United States Patent
Su et al.

(10) Patent No.: US 12,307,440 B2
(45) Date of Patent: May 20, 2025

(54) SECURED PAYMENT METHOD, SECURED PAYMENT DEVICE, AND COMPUTER-READABLE STORAGE MEDIUM

(71) Applicant: PAX COMPUTER TECHNOLOGY (SHENZHEN) CO., LTD., Guangdong (CN)

(72) Inventors: Xiaoyan Su, Guangdong (CN); Xiansheng Wu, Guangdong (CN); Ruizhi Tang, Guangdong (CN)

(73) Assignee: PAX COMPUTER TECHNOLOGY (SHENZHEN) CO., LTD., Guangdong (CN)

( * ) Notice: Subject to any disclaimer, the term of this patent is extended or adjusted under 35 U.S.C. 154(b) by 154 days.

(21) Appl. No.: 18/021,750

(22) PCT Filed: Jul. 14, 2021

(86) PCT No.: PCT/CN2021/106160
§ 371 (c)(1),
(2) Date: Feb. 16, 2023

(87) PCT Pub. No.: WO2022/042104
PCT Pub. Date: Mar. 3, 2022

(65) Prior Publication Data
US 2024/0062194 A1 Feb. 22, 2024

(30) Foreign Application Priority Data
Aug. 31, 2020 (CN) .......................... 202010894888.3

(51) Int. Cl.
*G06Q 20/00* (2012.01)
*G06Q 20/32* (2012.01)
(Continued)

(52) U.S. Cl.
CPC ......... *G06Q 20/382* (2013.01); *G06Q 20/322* (2013.01); *G06Q 20/4016* (2013.01)

(58) Field of Classification Search
CPC .............. G06Q 20/382; G06Q 20/322; G06Q 20/4016; G06Q 20/18; G06Q 20/20;
(Continued)

(56) References Cited

U.S. PATENT DOCUMENTS

| 8,706,556 B2 * | 4/2014 | Mestre | G06Q 20/40 705/17 |
| 10,614,445 B1 | 4/2020 | Dorsey et al. | |
| 2011/0078081 A1 * | 3/2011 | Pirzadeh | G06Q 20/20 455/411 |

FOREIGN PATENT DOCUMENTS

| CN | 103198399 A | 7/2013 |
| CN | 103218713 A | 7/2013 |

(Continued)

*Primary Examiner* — Dante Ravetti
(74) *Attorney, Agent, or Firm* — Brooks Kushman P.C.

(57) ABSTRACT

A secured payment method, secured payment device and computer-readable storage medium, relating to the technical field of Internet. The method comprises: detecting whether a mobile terminal is connected to a first secured payment module, wherein the first secured payment module shares a payment hardware interface with the mobile terminal; activating the payment hardware interface, if the detection result shows that the mobile terminal is connected to the first secured payment module; detecting whether the payment hardware interface is controlled by the first secured payment module or by the mobile terminal; providing a payment warning, if the detection result shows that the payment hardware interface is controlled by the mobile terminal. Thus, the manufacturing costs of the devices can be reduced, potential safety risk in some transaction can also be avoided, and a secured payment is guaranteed.

20 Claims, 5 Drawing Sheets

(51) Int. Cl.
*G06Q 20/38* (2012.01)
*G06Q 20/40* (2012.01)

(58) Field of Classification Search
CPC ............. G06Q 20/206; G06Q 20/3227; G06Q 20/3278; G06Q 20/401; G06Q 20/4012; G06Q 20/40145; G06Q 20/407; G06Q 20/3823
USPC .................. 705/16, 21, 59; 380/44, 262, 278
See application file for complete search history.

(56) References Cited

FOREIGN PATENT DOCUMENTS

| CN | 103426250 A | 12/2013 |
|----|-------------|---------|
| CN | 106296189 A | 1/2017 |
| CN | 112036858 A | 12/2020 |

* cited by examiner

SECURED PAYMENT METHOD, SECURED PAYMENT DEVICE, AND COMPUTER-READABLE STORAGE MEDIUM

CROSS-REFERENCE TO RELATED APPLICATIONS

This disclosure is a 35 U.S.C. § 371 national stage application of PCT application No. PCT/CN2021/106160, filed on Jul. 14, 2021, which claims the benefit of Chinese Patent Application No. 202010894888.3 filed with China National Intellectual Property Administration on Aug. 31, 2020 and entitled "SECURED PAYMENT METHOD, APPARATUS SYSTEM", the entire contents of which are incorporated herein by reference.

TECHNICAL FIELD

The present disclosure relates to the technical field of Internet, and more particularly, relates to a secured payment method, secured payment device and computer-readable storage medium.

BACKGROUND

With continuous development of Internet technologies, mobile payments have gradually infiltrated various aspects of people's live, and the functions of mobile terminals are increasingly powerful, such as the integrated functions of NFC (Near Field Communication), face recognition, code scanning, and the like. However, the various payment solutions have led to increased payment security risks, besides, the various hardware in the mobile terminals have not reduced the manufacturing costs of payment devices.

In addition, an intelligent POS (Point of Sale) is increasingly akin to a mobile phone and fully functional. Compared with a traditional POS terminal, the intelligent POS has the merchant and the user experience improved. Due to the fact that the intelligent POS terminal device processes payment related transactions, PCI security authentication requirements must be met, and therefore, applications can be downloaded only after a signature is verified, and users cannot update and download the applications freely, which is not flexible and convenient enough.

SUMMARY

In view of this, the embodiments of this disclosure provide a secured payment method, apparatus and system, so as to at least solve the problems in the prior art that the manufacturing costs of the payment devices are too high, and the payment security risks are relatively higher.

A first aspect of the embodiments of this disclosure provides a secured payment method for a secured payment device provided with at least one secured payment module, comprising: detecting whether a mobile terminal is connected to a first secured payment module, the first secured payment module shares a payment hardware interface with the mobile terminal; activating the payment hardware interface if the detection result shows that a mobile terminal is connected to the first secured payment module; detecting whether the payment hardware interface is controlled by the first secured payment module or by the mobile terminal during a payment process; providing a payment warning if the detection result shows that the payment hardware interface is controlled by the mobile terminal.

A second aspect of the embodiments of this disclosure provides a secured payment apparatus, comprising: a terminal detecting unit, configured to detect whether a mobile terminal is connected to a first secured payment module of a secured payment device, the first secured payment module shares a payment hardware interface with the mobile terminal; a shared interface activating unit, configured to activate the payment hardware interface when the detection result shows that the mobile terminal is connected to the first secured payment module; an interface control detecting unit, configured to detect whether the payment hardware interface is controlled by the first secured payment module or by the mobile terminal during a payment process; a payment warning triggering unit, configured to provide a payment warning when the detection result shows that the payment hardware interface is controlled by the mobile terminal.

A third aspect of the embodiments of this disclosure provides a secured payment system, comprising: a secured payment device, provided with at least one secured payment module, a first secured payment module is provided with a first component; a mobile terminal, provided with a second component matching the first component; when the first component and the second component are engaged, the first secured payment module is connected to the mobile terminal, and a payment hardware interface shared between the first secured payment module and the mobile terminal is activated; the secured payment device is used to detect whether the payment hardware interface is controlled by the first secured payment module or by the mobile terminal during a payment process; when the detection result shows that the payment hardware interface is controlled by the mobile terminal, the secured payment device provides a payment warning.

A fourth aspect of the embodiments of this disclosure provides a secured payment device, comprising a storage, a processor, and a computer program stored in the storage and executable on the processor, when executing the computer program, the processor implements the steps of the above method.

A fifth aspect of the embodiments of this disclosure provides a computer-readable storage medium storing a computer program, which, when executed by a processor, implements the steps of the above method.

A sixth aspect of the embodiments of this disclosure provides a compute program product, which, when running on a mobile terminal, makes the mobile terminal to implement the steps of the above method.

Compared with prior art, the embodiments of this disclosure have the following beneficial effects:

By providing a secured payment device with at least one secured payment module and sharing a payment hardware interface between the secured payment module and a mobile terminal, the manufacturing cost of the devices can be reduced. By detecting whether the payment hardware interface is controlled by the secured payment module or by the mobile terminal in a payment process and providing a payment warning when it is the mobile terminal that controls the payment hardware interface, users are warned to not use the payment solution on the basis of the payment hardware interface shared with the mobile terminal, thereby potential safety risk in some transaction can be avoided, and a secured payment is guaranteed.

BRIEF DESCRIPTION OF THE DRAWINGS

To more clearly illustrate the technical solutions in the embodiments of the disclosure, the figures to be referenced will be briefly described in the following. Apparently, the described figures are merely some of the embodiments of the present disclosure, and it is possible for those skilled in the art to obtain other figures on the basis of these figures without paying creative labor.

DETAILED DESCRIPTION OF THE EMBODIMENTS

Figure 1:
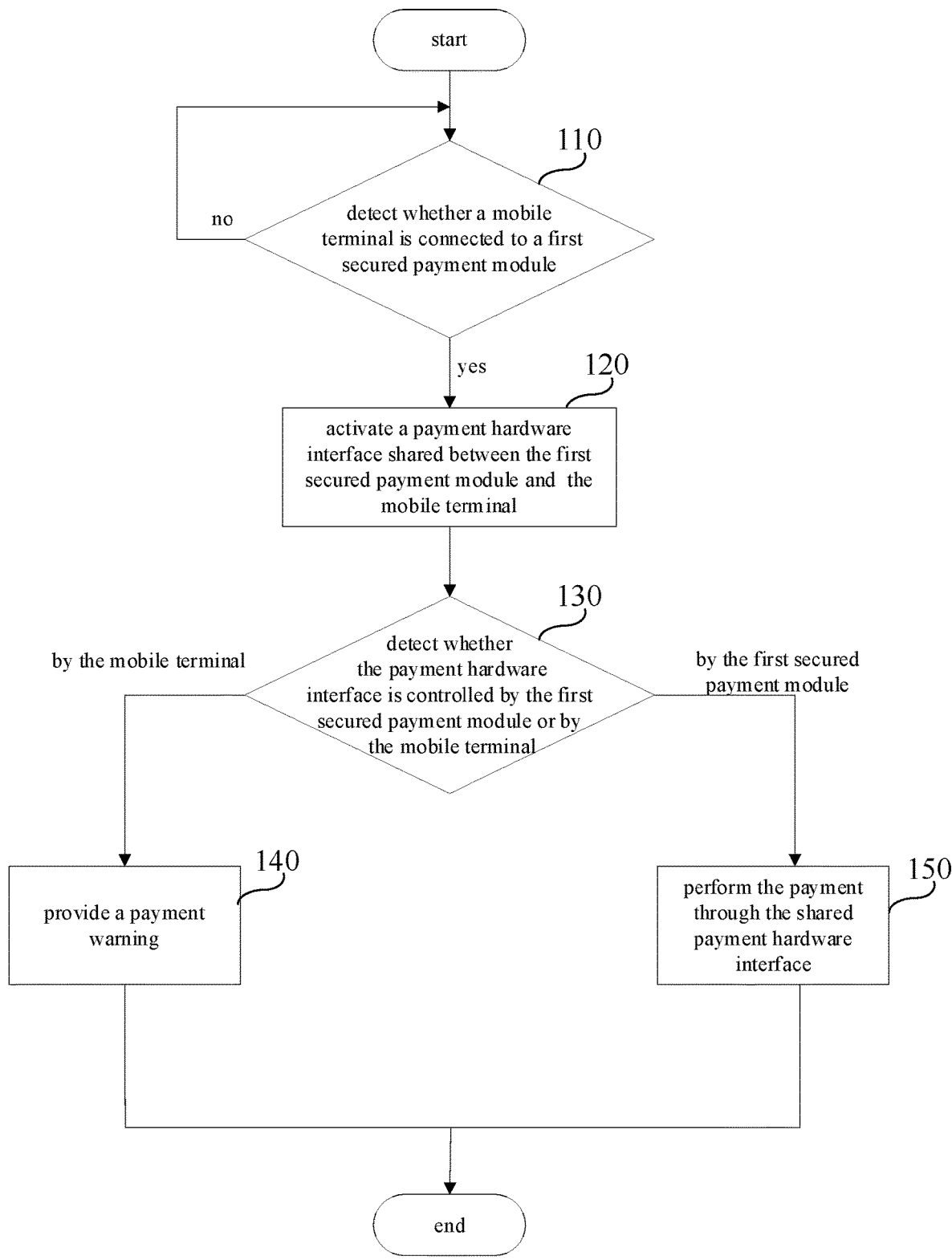
FIG. 1 shows an exemplary flowchart of a secured payment method according to an embodiment of this disclosure.

In the following descriptions, for purposes of explanation instead of limitation, specific system architectures, technical details, and the like are set forth in order to provide a thorough understanding of the embodiments of the present disclosure. However, it will be apparent to those skilled in the art that the present disclosure may be implemented in other embodiments without these specific details. In other instances, detailed descriptions of well-known systems, apparatuses, circuits, and methods are omitted so as not to obscure the description of the present disclosure with unnecessary details.

To illustrate the technical solutions of the present disclosure, specific embodiments will be described below.

It will be understood that the terms "comprises" when used in this specification and the appended claims, specifies the presence of stated features, integers, steps, operations, elements, and/or components, but does not preclude the presence or addition of one or more other features, integers, steps, operations, elements, components, and/or groups thereof.

The terminology used in the description of the disclosure herein is for the purpose of describing particular embodiments only and is not intended to be limiting of the invention. As used in the description of the disclosure and the appended claims, the singular forms "a", "an" and "the" are intended to include the plural forms as well, unless the context clearly indicates otherwise.

It will also be understood that the term "and/or" as used in the description of the disclosure and the appended claims refers to and encompasses any and all possible combinations of one or more of the associated listed items.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In specific implementation, the mobile terminal described in the embodiments of the present disclosure includes, but is not limited to, mobile phones with touch-sensitive surfaces (for example, touch screen displays and/or touch pads), laptop computers, or other portable devices such as tablet computers. It should also be understood that in some embodiments, the above-mentioned devices are not portable communication devices but desktop computers with touch-sensitive surfaces (for example, touch screen displays and/or touch pads).

In the following discussion, a mobile terminal including a display and a touch-sensitive surface is described. However, it should be understood that the mobile terminal may include one or more other physical user interface device, such as a physical keyboard, a mouse, and/or a joystick.

Various applications that can be executed on the mobile terminal can use at least one common physical user interface device such as a touch-sensitive surface. One or more functions of the touch-sensitive surface and corresponding information displayed on the terminal can be adjusted and/or changed between applications and/or within corresponding applications. In this way, the common physical architecture of the terminal (for example, a touch-sensitive surface) can support various application programs with a user interface that is intuitive and transparent to the user.

In addition, in the descriptions of this disclosure, the terms "first", "second", "third", and the like are merely intended for a purpose of differentiated description, but shall not be understood as an indication or an implication of relative importance.

FIG. 1 shows an exemplary flowchart of a secured payment method according to an embodiment of this disclosure. The executor of the method according to the embodiment of this disclosure may be a secured payment device provided with a secure chip or a secure processor, such as a POS terminal, a face-scanning terminal, or the like.

In some examples of the embodiments of this disclosure, the secured payment device may be referred to as an SD (Secure Device), which is a terminal allowing for password entry (PIN Entry) and/or processing Account Data, and is usually specially designed for payment processing, and may be provided with a secure processor (SP) used for processing a secured payment. The secured payment device may be a point-of-sale terminal (POS), an intelligent point-of-sale terminal, a contactless card reader, an IC card reader, an MSR card reader, a password keyboard, etc.

Here, SP refers to a security alarm detecting module, which may be powered by a backup battery all the time (24 hours a day) and detect the state of the device in real time. Moreover, once it is detected that the device is under attack, security information such as the key is erased, thereby ensuring the security of the user information. Besides, one or more SPs may be integrated in a secured payment module (or Security Module, SM, for short).

In the current related art, an intelligent POS is provided with an SP and an AP (Application Processor). Here, the application processor supports an intelligent operating system (for example, an Android system) and has high security. However, all applications can be downloaded only after a signature is verified, and users cannot update and download the applications freely. In addition, a mobile phone POS (Contactless Payments on COTS) refers to a contactless payment performed on a COTS (Commercial Off-The-Shelf) device, for example, a contactless transaction directly performed by using an NFC of a mobile phone. But it only supports contactless and password-free transaction and no PIN can be entered, resulting in that a large transaction cannot be performed.

In addition, in a SPOC (Software-Based Pin Entry on COTS) arrangement, PIN is entered at the mobile phone terminal to support applications' requirement for signature verification and the card reader supports ICR, MSR, and CTLS, and PIN is not allowed to be entered when MSR is in use. However, it only supports online transactions, and the devices must be a mobile phone plus a card reader.

In addition, there are some application instances where a complete machine of a secured payment device is combined with a commercial device to perform a payment. In these cases, the complete machine terminal of the secured payment device supports a payment transaction, and the commercial device terminal supports applications' requirement for no signature verification. However, the secured payment device being a complete machine results in poor flexibility of assembly, and requires the complete machine to be adapted to the commercial device, which is not good for the development of the diversity of payment solutions.

In addition, there are some application instances where a secured payment module and a commercial device (their hardware interfaces are independent of each other) perform a payment. However, the independent interfaces of the secured payment module and the commercial device results in poor flexibility of assembly, interface redundancy, and higher manufacturing costs.

As shown in FIG. 1, in step 110, detect whether a mobile terminal is connected to a first secured payment module. Here, the first secured payment module and the mobile terminal share a payment hardware interface.

Here, the mobile terminal may also be referred to as a CD (Commercial Device), which may be a mobile device (such as a smart phone or tablet computer) or a desktop device (a cash register, a meal vending machine, etc.) designed for a common consumption market, may not be specially designed for payment processing, and may not be provided with a payment secure module. In addition, the mobile terminal generally allows for applications' requirement for no signature verification, for example, it is realized on the basis of a configured AP, and the requirement for no signature verification of daily applications of users can be met.

It should be understood that the term "first secured payment module" is not intended to limit the number of the secured payment module, and it may represent one or more secured payment modules.

If the detection result in step 110 shows that a mobile terminal is connected to the first secured payment module, proceed to step 120; and if the detection result in step 110 shows that no mobile terminal is connected to the first secured payment module, proceed to step 110, to continuously monitor whether a mobile terminal is connected.

In step 120, activate a payment hardware interface shared between the first secured payment module and the mobile terminal. Here, the payment hardware interface may represent one or more hardware interfaces related to a payment process, such as a camera, a fingerprint module, etc.

In one example of the embodiments of this disclosure, the mobile terminal is provided with a camera, and when the mobile terminal establishes a connection with the secured payment module, the secured payment module may share the camera of the mobile terminal and no redundancy needs to be additionally provided in the secured payment device, thereby saving the manufacturing cost of the secured payment device. In another example of the embodiments of this disclosure, the secured payment device is provided with a camera, and when the mobile terminal establishes a connection with the secured payment module, the mobile terminal may share the camera of the secured payment device, thereby saving the manufacturing cost of the mobile terminal.

In step 130, detect whether the payment hardware interface is controlled by the first secured payment module or by the mobile terminal during a payment process.

If the detection result in step 130 shows that the payment hardware interface is controlled by the mobile terminal, proceed to step 140. And if the detection result in step 130 shows that the payment hardware interface is controlled by the first secured payment module, proceed to step 150.

In step 140, provide a payment warning.

In step 150, perform the payment through the shared payment hardware interface.

In the embodiments of this disclosure, the secured payment module of the secured payment device can share the interface with the mobile terminal, and can also restrict the mobile terminal from performing the payment through the shared payment hardware interface with a warning prompt, thereby ensuring the security of the payment process.

With regard to the above step 140, the payment warning may be implemented by using various warning means and combinations thereof. For example, the payment warning may be implemented by using a display connected with the payment hardware interface to show a payment warning message for indicating a prohibited payment. In addition, the payment warning may also be implemented by using an indicator light connected with the payment hardware interface to flash. In addition, the payment warning may also be implemented by using a buzzier connected with the payment hardware interface to buzz. Therefore, when the mobile terminal controls the shared payment hardware interface, the user is warned not to perform the transaction by various warning means.

In some examples of the embodiments of this disclosure, the secured payment module may share with the mobile terminal various types of hardware interfaces, such as a camera, a contactless card reader, a touch screen, an LCD, a fingerprint module, a 4G module, a WiFi module, a BT module, a voice module, and the like. When the SM terminal transfers control of a payment related module, for example, the camera (the face recognition interface of the SM terminal), the contactless card reader, the touch screen (the PIN entry interface of the SM terminal), and etc., to the CD terminal, the interface independently controlled by the SM terminal must enter warning state.

In some application scenarios, the display connected with the secured payment module may display warning words such as "the commercial device terminal is controlling the payment interface, and the payment transaction is prohibited!", to warn the user not to perform the payment transaction at this time. In some other application scenarios, the LED independently controlled by the SM terminal is on to warn that the payment transaction is prohibited. Here, the interface (for example, an LCD2 or LED, etc.) independently controlled by the SM terminal may be physically protected.

Figure 2:
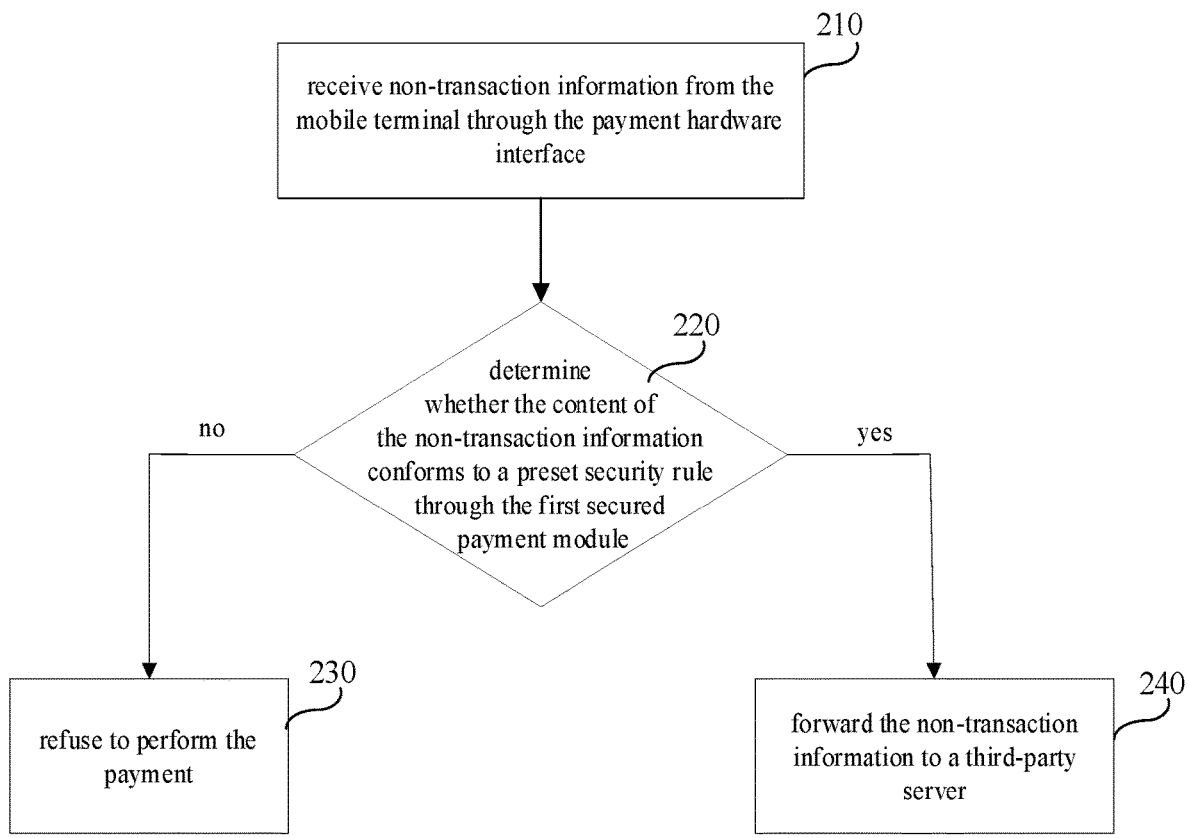
FIG. 2 shows an exemplary flowchart of a secured payment method, in which a payment hardware interface is controlled by a mobile terminal, according to an embodiment of this disclosure.

FIG. 2 shows an exemplary flowchart of a secured payment method, in which a payment hardware interface is controlled by a mobile terminal, according to an embodiment of this disclosure.

In step 210, receive non-transaction information from the mobile terminal through the payment hardware interface.

In step 220, determine whether the content of the non-transaction information conforms to a preset security rule through the first secured payment module.

If the determination result in step 220 shows that the content of the non-transaction information does not conform to the preset security rule, proceed to step 230; if the determination result in step 220 shows that the content of the non-transaction information conforms to the preset security rule, proceed to step 240.

In step 230, refuse to perform the payment. For example, the payment process may be directly interrupted to ensure security.

For example, the secured payment module may be provided in a secure chip, and the non-transaction information can be detected by the secure chip to determine whether there is a false transaction. When it is determined that the non-transaction information probably relates to a relatively large false transaction, the payment is refused, so that the security of the transaction can be guaranteed.

In step 240, forward the non-transaction information to a third-party server. Here, when the secured payment module determines the non-transaction information as low risk, the non-transaction information may be forwarded to the third-party server to continue a corresponding operation.

According to the embodiments of this disclosure, when the mobile terminal controls the payment hardware interface shared with the secured payment device, if the mobile terminal controls the payment hardware interface, the related information must be forwarded and processed by the secure device terminal, and analyzed and determined according to the information of the processing module, so that if the related information is related to a transaction and may be risk, the mobile terminal is prohibited from further controlling the hardware interface. Here, the secured payment device can determine the safety probability of the related information, which ensures that the payment transaction can be performed safely. In addition, the secured payment device is used to forward the non-transaction information, so that the security of the payment function can be realized, and the normal process of other related functions can be ensured.

In some examples of the embodiments of this disclosure, the payment hardware interface includes one or more of the following: a camera, a screen, a card reader, a key module, a fingerprint module, and a voice module. Here, the screen may include a touch screen and a display screen, and the card reader may support reading various types of magnetic cards such as an IC card, a magnetic stripe card, and a contactless IC card. It should be noted that the payment hardware interface described herein is for example only, and is not a limitation, for example, the mobile terminal may control other types of hardware interfaces shared with the secured payment module and not listed here. Therefore, hardware interfaces for various payment solutions may be shared between the secured payment module and the mobile terminal, and the payment processes corresponding to the shared hardware interfaces of the mobile terminal can be restricted, thereby ensuring the security of the payment while satisfying a personalized application payment scenario.

In some examples of the embodiments of this disclosure, the hardware interfaces such as a camera, a touch screen, an LCD, a fingerprint module, a 4G module, a WiFi module, a BT module, and a voice module are shared between the secured payment module and the mobile terminal. Here, the CD terminal cannot directly control the payment related module, and the SM terminal needs to do the forwarding.

In some application scenarios, when the CD terminal requests to control the shared screen interface, the non-transaction information needs to be forwarded by the SM terminal, and the SM terminal may parse the non-transaction information during the forwarding to determine whether the non-transaction information is legitimate. If the parsed content may relate to a false transaction, the transaction is interrupted. In some other application scenarios, when the CD terminal needs to control the screen interface, the SM terminal needs to do the forwarding to a corresponding third-party server, and in this case the SM terminal does not parse the received information, and can directly display a warning message (for example, "not a payment transaction interface, payment transaction prohibited!", etc.) at the SM terminal.

In some application scenarios, at least one secured payment module in the secured payment device includes a second secured payment module that does not share a payment hardware interface with the mobile terminal. In this way, a part of hardware interfaces (for example, a camera, a contactless card reader, a touch screen, an LCD, a fingerprint module, a 4G module, a WiFi module, a BT module, or a voice module) are shared between the first secured payment module and the mobile terminal (or CD) to form a combined device, which is then connected to the second secured payment module. During processing of a payment, the combination device performs a first stage of the secured processing, and after that, the second secured payment module performs a next stage of the secured processing. Therefore, it is possible to modularize the processing of a payment of the secure modules, so that the combination of a secured payment module and a mobile terminal (for example, by attaching the mobile terminal with a corresponding secured payment module) is very flexible and facilitates practical applications.

Figure 3:
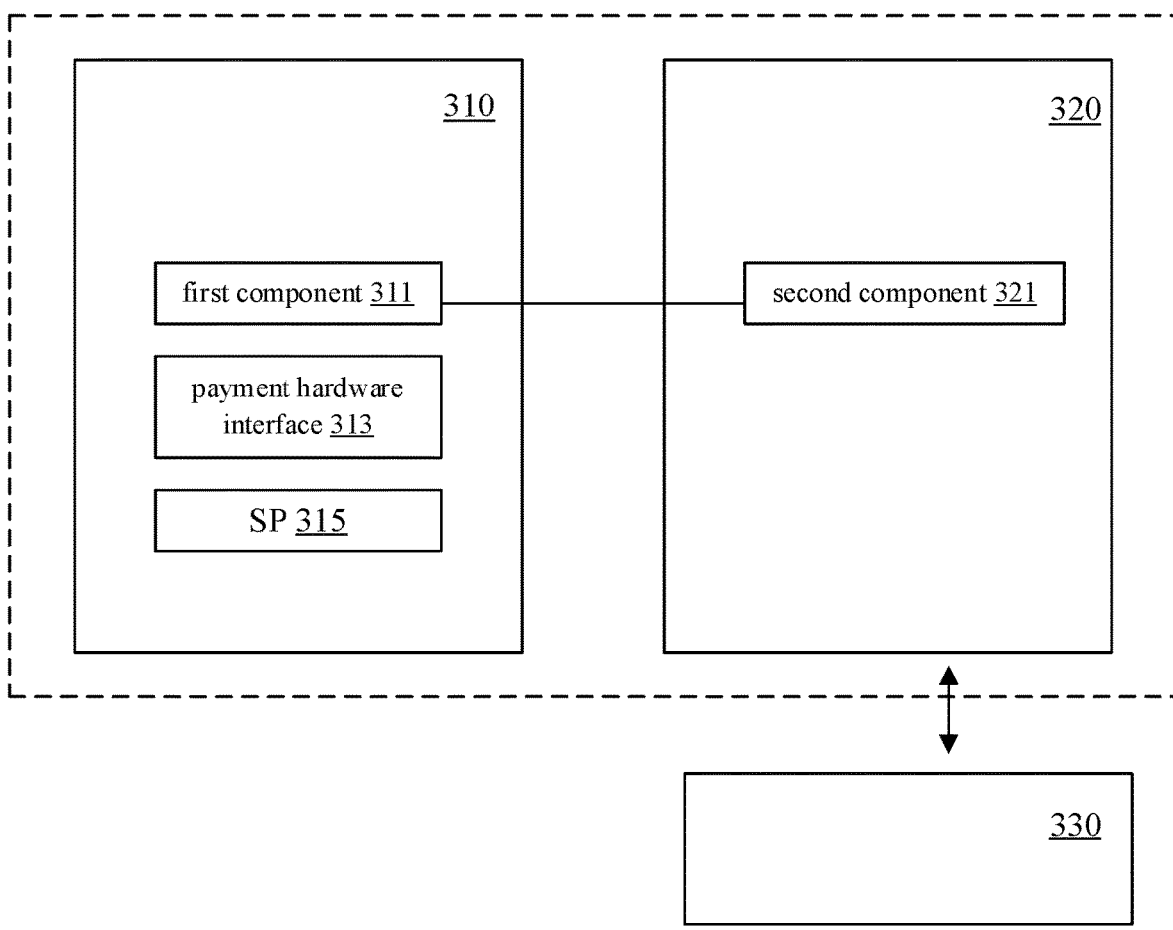
FIG. 3 is an exemplary structural block diagram of a secured payment system according to an embodiment of this disclosure.

FIG. 3 is an exemplary structural block diagram of a secured payment system according to an embodiment of this disclosure.

As shown in FIG. 3, the secured payment system 300 includes a first secured payment module 310, which is a secured payment module provided in the first secured payment device, and a mobile terminal 320. Specifically, the first secured payment module 310 is provided with a first component 311, and the mobile terminal 320 is provided with a second component 321 matching the first component 311.

Here, when the first component 311 and the second component 321 are engaged, the first secured payment module 310 is connected to the mobile terminal 320, and a payment hardware interface 313 shared between the first secured payment module 310 and the mobile terminal 320 is activated.

Further, the first secured payment module 310 detects whether the payment hardware interface is controlled by the first secured payment module 310 or by the mobile terminal 320 during a payment process, and when it is detected that the payment hardware interface is controlled by the mobile terminal 320, the first secured payment device provides a payment warning.

In some examples of the embodiments of this disclosure, the first component and the second component may be a part of the shared payment hardware interface, respectively. For example, the first component and the second component are a part of a PCB of a certain payment hardware interface, respectively, and when the first component and the second component are engaged, they may be electrically connected and the payment hardware interface may be activated.

Though FIG. 3 shows only one first secured payment module 310, it should be understood that there may be a plurality of first secured payment modules in the first secured payment device and the mobile terminal 320 may be connected to a plurality of first secured payment modules through the second component.

In some implementations, the secured payment system 300 further includes a second secured payment device 330. In one example of the embodiments of this disclosure, the second secured payment device 330 may not share a hardware interface with the mobile terminal. Therefore, the first secured payment module 310 and the mobile terminal 320, which have been engaged and sharing the payment hardware interface 313, may communicate as a whole with the second secured payment device 330. In another example of the embodiments of this disclosure, both the second secured payment device 330 and the first secured payment module 310 can share a corresponding payment hardware interface with the mobile terminal 320.

In some examples of the embodiments of this disclosure, the first component and the second component may be engaged through at least one of the following: a metal contact, a snap joint, an elastic pin, and a PCB.

It should be noted that the above connection between the first component and the second component is merely an example, and is not a limitation to the implementation scope of the embodiments of this disclosure. For example, the first component and the second component may also be engaged by other means not described herein, which are all within the protection scope of this disclosure.

Therefore, various connections can be implemented between the secured payment module and the mobile terminal, and requirements of personalized application service scenarios can be satisfied.

In some examples of the embodiments of this disclosure, a payment hardware interface 313 is provided in the first secured payment module 310 to allow for a corresponding input of non-transaction information, such as a password input and/or an account input. As examples, the payment hardware interface 313 may be a physical key pad or a touch screen for entering a PIN, a card reader supporting MSR, CTLS or ICR, a camera supporting facial images collection or reading a two-dimensional code, and the like. In addition, in the first secured payment module 310, an SP 315 is also provided to ensure the security of the user information.

In addition, various firmware (not shown), such as an AP1 with secure boot or with a SP-controlled boot, may also be provided in the secured payment device. Here, SP and AP1 are separate ICs or integrated ICs. Preferably, the secured payment device may further be provided with various peripheral device components, such as components for supporting functions such as communication, power supply, voice, storage, display, printing, biometric identification and etc., and may also be configured to have an anti-removal software and hardware design.

In some examples of the embodiments of this disclosure, the mobile terminal 320 is provided with an AP2 for supporting applications' requirement for no signature verification, and the mobile terminal 320 is not used for processing payment related sensitive data and sensitive services (for example, PIN input, account data input, etc.).

In addition, the mobile terminal 320 may also be provided with various peripheral device components (not shown), such as components for supporting functions such as communication, power supply, voice, storage, display, printing, biometric identification, NFC, and the like, and may also be configured to have an anti-removal software and hardware design. Preferably, an AP3 may be provided for supporting applications' requirement for signature verification.

In some embodiments, when the CD terminal and the SM terminal share a payment related functional interface, the SP of the SM terminal will prohibit the AP of the CD terminal from invoking the payment related functional interface. In addition, when the CD and the SM share the payment related functional interface, it is possible to take a plurality of countermeasures to prevent a false transaction when the CD terminal is controlling the interface. For example, when the interface is controlled by the CD terminal, a certain interface independently controlled by the SM enters warning state, for example, an indicator light independently controlled by the SP of the SM terminal comes on, a buzzer sounds, a display screen displays warning words, etc. In addition, the SP, AP1, and AP2 may also be integrated ICs.

It should be noted that neither part of the secured payment module of the secured payment device nor the mobile terminal is an independent wholeness, and the two share a part of the hardware interface module, contain payment related and non-payment related modules, but are not completely physically independent and isolated. Or, part of the secured payment module is an independent wholeness, and functionally independent and physically isolated from the remaining part of the SM and the CD.

Here, the combination forms (or the connection methods) of the part of the secured payment module and the mobile terminal may be various, and part or all of the functional modules (such as a PCB) may be shared between the SM and the CD. In addition, the SM assembly and the CD assembly are physically joined together by snap joint, adhesive tape, viscose, or laser welding. In addition, part or all of the housing may also be shared between the SM assembly and the CD assembly. In addition, the SM and the CD may also be housed by one structural member or other one or more devices to combine into an integrated device.

In some embodiments, the SM and the CD may be communicatively connected in various manners, for example, the SM and the CD may be connected by means of a FPC, a cable, a transit PCB, an elastic pin, a metal contact or other intermediary structural member, a transit device; or the SM and the CD may be wirelessly connected by means of WiFi, BT, or infrared, etc.

It should be noted that the terms "secured payment module" or "SM" described in the embodiments of this disclosure may be replaced with "secured payment device" or "SD" without departing from the spirit of the embodiments of this disclosure, and are all within the scope of the embodiments of this disclosure.

By using the secured payment system of the embodiments of this disclosure, the secured payment module in the secured payment device and the mobile terminal are combined and share a hardware interface, which can reduce hardware cost and hardware volume, and improve flexibility. In addition, a merchant may have a better user experience, not only the daily applications' requirement for no signature verification can be met, but also the need for high security of payment related transactions. Also, multiple payment application forms are provided, which reduces the number of devices used by merchants, and can also meet the multiple requirements from different markets and users.

Figure 4:
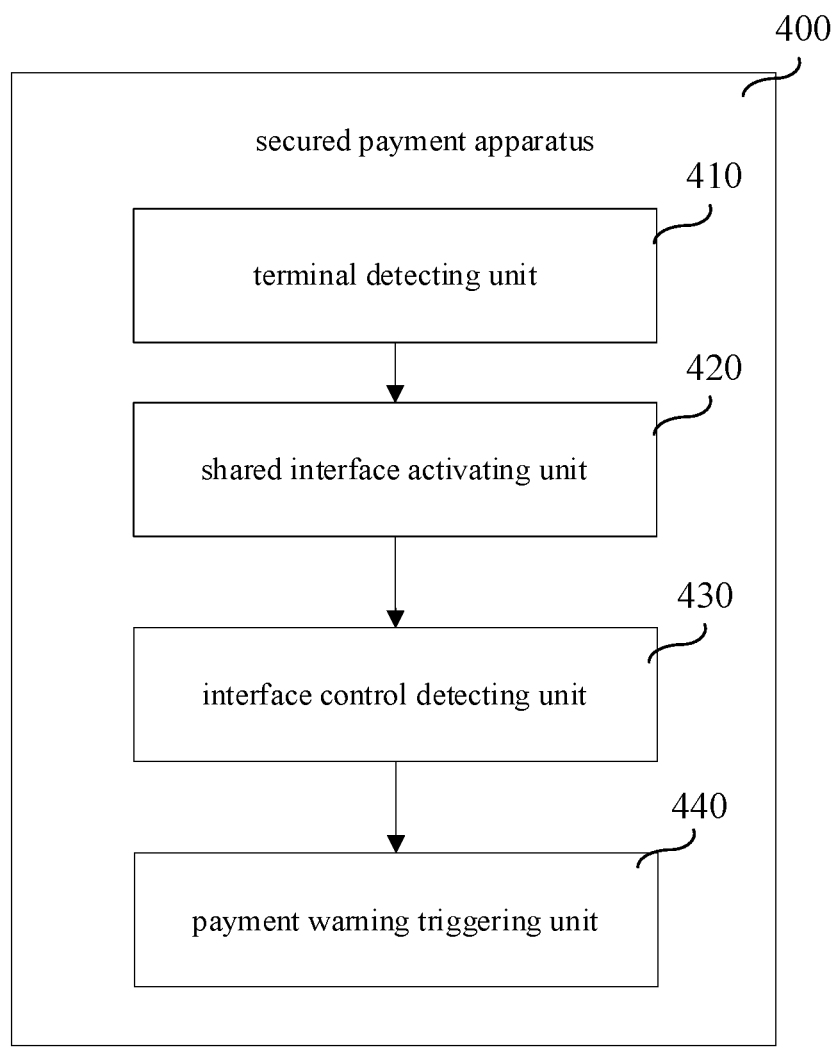
FIG. 4 is an exemplary schematic structural diagram of a secured payment apparatus according to an embodiment of this disclosure.

FIG. 4 is an exemplary schematic structural diagram of a secured payment apparatus according to an embodiment of this disclosure.

As shown in FIG. 4, the secured payment apparatus 400 includes a terminal detecting unit 410, a shared interface activating unit 420, an interface control detecting unit 430, and a payment warning triggering unit 440.

The terminal detecting unit 410 is configured to detect whether a mobile terminal is connected to a first secured payment module of a secured payment device, the first secured payment module shares a payment hardware interface with the mobile terminal.

The shared interface activating unit 420 is configured to activate the payment hardware interface when the detection result shows that the mobile terminal is connected to the first secured payment module.

The interface control detecting unit 430 is configured to detect whether the payment hardware interface is controlled by the first secured payment module or by the mobile terminal during a payment process.

The payment warning triggering unit 440 is configured to provide a payment warning when the detection result shows that the payment hardware interface is controlled by the mobile terminal.

In some examples of the embodiments of this disclosure, the apparatus 400 may further include a non-transaction information receiving unit 450, a security rule verifying unit 460, and a secured transaction performing unit 470.

The non-transaction information receiving unit 450 is configured to receive non-transaction information through the payment hardware interface from the mobile terminal when the detection result shows that the payment hardware interface is controlled by the mobile terminal.

The security rule verifying unit 460 is configured to determine whether the content of the non-transaction information conforms to a preset security rule through the first secured payment module.

The secured transaction performing unit 470 is configured to refuse the payment if the content of the non-transaction information does not conform to the security rule; and to forward the non-transaction information to a third-party server if the content of the non-transaction information conforms to the security rule.

It should be noted that reference may be made to the method embodiments for the content such as information interaction and processes between the devices/units described above, the specific functions thereof and the technical effects brought about, because they are of the same concept as the method embodiments of this disclosure, and the details are not described herein again.

Figure 5:
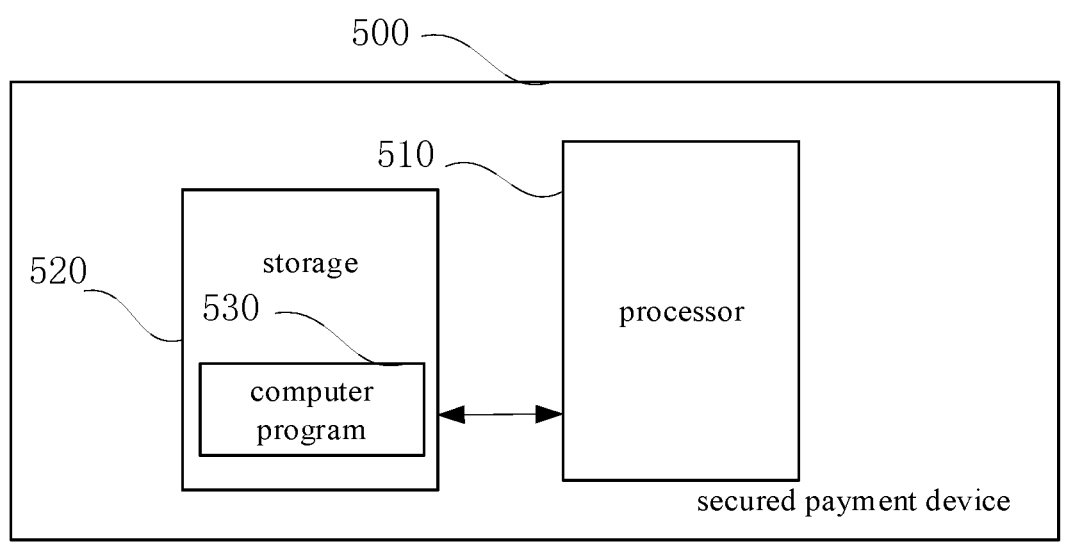
FIG. 5 is an exemplary schematic diagram of a secured payment device according to an embodiment of this disclosure.

FIG. 5 is an exemplary schematic diagram of a secured payment device according to an embodiment of this disclosure. As shown in FIG. 5, the secured payment device 500 of this embodiment includes: a processor 510, a storage 520, and a computer program 530 stored in the storage 520 and executable on the processor 510. When executing the computer program 530, the processor 510 implements the steps of the above secured payment method embodiments, such as the steps 110-150 shown in FIG. 1. Alternatively, when executing the computer program 530, the processor 510 implements the functions of the modules/units in the foregoing apparatus embodiments, for example, the functions of the units 410-470 shown in FIG. 4.

For example, the computer program 530 may be divided into one or more modules/units, and the one or more modules/units are stored in the storage 520 and executed by the processor 510 to complete this disclosure. The one or more modules/units may be a series of computer program instruction segments capable of completing a specific function, the instruction segments being used to describe an execution process of the computer program 530 in the secured payment device 500. For example, the computer program 530 may be divided into a terminal detecting module, a shared interface activating module, an interface control detecting module, and a payment warning triggering module, and their specific functions are as follows:

The terminal detecting unit is configured to detect whether a mobile terminal is connected to a first secured payment module of the secured payment device, the first secured payment module shares a payment hardware interface with the mobile terminal.

The shared interface activating unit is configured to activate the payment hardware interface when the detection result shows that the mobile terminal is connected to the first secured payment module.

The interface control detecting unit is configured to detect whether the payment hardware interface is controlled by the first secured payment module or by the mobile terminal during a payment process.

The payment warning triggering unit is configured to provide a payment warning when the detection result shows that the payment hardware interface is controlled by the mobile terminal.

The secured payment device 500 may be a computing device such as a desktop computer, a notebook computer, a tablet computer, and a cloud server. The secured payment device 500 may include, but is not limited to, a processor 510 and a storage 520. It can be understood by those skilled in the art that FIG. 5 is merely an example of the secured payment device 500 and does not constitute any limitation on the secured payment device 500, and may include more or fewer components than those shown in the figure, or a combination of some components or different components. For example, the secured payment device 500 may further include an input/output device, a network access device, a bus, and the like.

The processor 510 may be a Central Processing Unit (CPU), or be other general purpose processor, a Digital Signal Processor (DSP), an Application Specific Integrated Circuit (ASIC), a Field-Programmable Gate Array (FPGA), or be other programmable logic device, a discrete gate or transistor logic device, a discrete hardware component, and etc. The general purpose processor may be a microprocessor, or the processor may also be any conventional processor.

The storage 520 may be an internal storage unit of the secured payment device 500, for example, a hard disk or a memory of the secured payment device 500. The storage 520 may also be an external storage device of the secured payment device 500, for example, a plug-in hard disk, a Smart Media Card (SMC), a Secure Digital (SD) card, a Flash Card, and the like, which is provided on the secured payment device 500. Further, the storage 520 may include both the internal storage unit and the external storage device, of the secured payment device 500. The storage 520 is configured to store the computer program and other programs and data required by the secured payment device 500. The storage 520 may also be used to temporarily store data that has been or will be output.

Those skilled in the art may clearly understand that, for the convenience and simplicity of description, the division of the above-mentioned functional units or modules is merely an example for illustration. In actual applications, the above-mentioned functions may be allocated to be performed by different functional units or modules according to requirements, that is, the internal structure of the device may be divided into different functional units or modules to complete all or part of the above-mentioned functions. The functional units or modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit or module is merely for the convenience of distinguishing each other and are not intended to limit the scope of protection of the present disclosure. For the specific operation process of the units or modules in the above-mentioned system, reference may be made to the corresponding processes in the above-mentioned method embodiments.

In the above-mentioned embodiments, the description of each embodiment has its focuses, and for the parts which are not described or mentioned in one embodiment, the related descriptions in other embodiments may be referred to.

Those skilled in the art may understand that, the exemplary units and steps described in the embodiments disclosed herein may be implemented through electronic hardware or a combination of computer software and electronic hardware. Whether these functions are implemented through hardware or software depends on the specific application and design constraints of the technical schemes. Those skilled in the art may implement the described functions in different manners for each particular application, while such implementation should not be considered as beyond the scope of the present disclosure.

In the embodiments provided by the present disclosure, it should be understood that the disclosed apparatus/secured payment device and method may be implemented in other manners. For example, the above-mentioned apparatus/secured payment device embodiment is merely exemplary. For example, the division of modules or units is merely a logical functional division, and other division manner may be used in actual implementations, for example, multiple units or components may be combined or be integrated into another system, or some of the features may be ignored or not performed. In addition, the shown or discussed mutual coupling or direct coupling or communication connection, may be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a computer-readable storage medium. Based on this understanding, all or part of the processes of the method for implementing the above-mentioned embodiments of the present disclosure may also be implemented by instructing relevant hardware through a computer program. The computer program may be stored in a computer-readable storage medium, which may implement the steps of each of the above-mentioned method embodiments when executed by a processor. Wherein, the computer program includes computer program codes which may be in the form of source codes, object codes, executable files, or certain intermediate and the like. The computer-readable medium may include any primitive or device capable of carrying the computer program codes, a recording medium, a USB flash drive, a portable hard disk, a magnetic disk, an optical disk, a computer memory, a Read-Only Memory (ROM), a Random Access Memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A secured payment method for a secured payment device provided with at least one secured payment module, comprising:
   executing, by the secured payment device, a first detection to detect whether a mobile terminal is connected to a first secured payment module, wherein the first secured payment module shares a payment hardware interface with the mobile terminal;
   determining, by the secured payment device, that the executed first detection result shows that the mobile terminal is connected to the first secured payment module;
   based on a determination, by the secured payment device, that the executed first detection result shows that the mobile terminal is connected to the first secured payment module, activating, by the secured payment device, the payment hardware interface;
   executing, by the secured payment device, a second detection that determines that the payment hardware interface is controlled by the first secured payment module or by the mobile terminal during a payment process;
   determining, by the secured payment device, that the second detection result shows that the payment hardware interface is controlled by the mobile terminal; and
   providing, by the secured payment device, a payment warning, based on a determination, by the secured payment device, that the second detection result shows that the payment hardware interface is controlled by the mobile terminal.

2. The secured payment method according to claim 1, further comprising:
   if the second detection result shows that the payment hardware interface is controlled by the secured payment device,
   the secured payment device receiving non-transaction information from the mobile terminal through the payment hardware interface;
   the secured payment device determining whether a content of the non-transaction information conforms to a preset security rule through the first secured payment module;
   the secured payment device refusing the payment, if the content of the non-transaction information does not conform to the preset security rule; and the secured payment device forwarding the non-transaction information to a third-party server, if the content of the non-transaction information conforms to the preset security rule.

3. The secured payment method according to claim 1, wherein the secured payment device providing the payment warning comprises at least one of:
   the secured payment device using a display connected to the payment hardware interface to show a payment warning message for indicating a prohibited payment;
   the secured payment device using an indicator light connected to the payment hardware interface to flash; and
   the secured payment device using a buzzier connected to the payment hardware interface to buzz.

4. The secured payment method according to claim 1, wherein the at least one secured payment module comprises a second secured payment module which does not share a payment hardware interface with the mobile terminal.

5. A secured payment device providing with at least one secured payment module, comprising a non-transitory storage medium, a processor, and a computer program product in the non-transitory storage medium and executable on the processor, causes the processor to perform the steps of:
   executing, by the secured payment device, a first detection to detect whether a mobile terminal is connected to a first secured payment module, wherein the first secured payment module shares a payment hardware interface with the mobile terminal;
   determining, by the secured payment device, that the executed first detection result shows that the mobile terminal is connected to the first secured payment module;
   based on a determination, by the secured payment device, that the executed first detection result shows that the mobile terminal is connected to the first secured payment module, activating, by the secured payment device, the payment hardware interface;
   executing, by the secured payment device, a second detection that determines that the payment hardware interface is controlled by the first secured payment module or by the mobile terminal during a payment process;
   determining, by the secured payment device, that the second detection result shows that the payment hardware interface is controlled by the mobile terminal; and
   based on a determination, by the secured payment device, that the second detection result shows that the payment hardware interface is controlled by the mobile terminal; transmitting, by the secured payment device, a payment warning to the mobile device.

6. A non-transitory storage medium containing a computer product when executed by a processor, causes the processor to perform the steps of:
   executing a first detection to detect whether a mobile terminal is connected to a first secured payment module, wherein the first secured payment module shares a payment hardware interface with a mobile terminal;
   determining that the executed first detection result shows that the mobile terminal is connected to the first secured payment module;
   based on a determination, that the executed first detection result shows that the mobile terminal is connected to the first secured payment module, activating a payment hardware interface;
   executing, a second detection that determines that the payment hardware interface is controlled by the first secured payment module or by the mobile terminal during a payment process;
   determining, that the second detection result shows that the payment hardware interface is controlled by the mobile terminal; and
   based on a determination, that the second detection result shows that the payment hardware interface is controlled by the mobile terminal; transmitting, a payment warning to the mobile device.

7. The secured payment device according to claim 5, wherein the method further comprises:
   if the second detection result shows that the payment hardware interface is controlled by the secured payment device,
   the processor receiving non-transaction information from the mobile terminal through the payment hardware interface;
   the processor determining whether a content of the non-transaction information conforms to a preset security rule through the first secured payment module;
   the processor refusing the payment, if the content of the non-transaction information does not conform to the preset security rule; and
   the processor forwarding the non-transaction information to a third-party server, if the content of the non-transaction information conforms to the preset security rule.

8. The secured payment device according to claim 5, wherein the processor providing the payment warning comprises at least one of:
   the processor using a display connected to the payment hardware interface to show a payment warning message for indicating a prohibited payment;
   the processor using an indicator light connected to the payment hardware interface to flash; and
   the processor using a buzzier connected to the payment hardware interface to buzz.

9. The secured payment device according to claim 5, wherein the at least one secured payment module comprises a second secured payment module which does not share a payment hardware interface with the mobile terminal.

10. The secured payment device according to claim 5, wherein the first secured payment module is provided with a first component, and the mobile terminal is provided with a second component matching the first component;
    wherein when the first component and the second component are engaged, the first secured payment module is connected to the mobile terminal.

11. The secured payment device according to claim 10, wherein the first component and the second component are engaged through at least one of: a metal contact, a snap joint, an elastic pin, and a PCB.

12. The secured payment device according to claim 5, wherein the first secured payment module is provided with the payment hardware interface, and the mobile terminal shares the payment hardware interface when the mobile terminal is connected to the first secured payment module.

13. The secured payment device according to claim 12, wherein the first secured payment module is provided with a first component, and the mobile terminal is provided with a second component matching the first component;
    wherein when the first component and the second component are engaged, the mobile terminal is connected to the first secured payment module.

14. The secured payment device according to claim 13, wherein the first component is a part of the payment hardware interface.

15. The secured payment device according to claim 5, wherein the mobile terminal is provided with the payment hardware interface, and the first secured payment module shares the payment hardware interface when the mobile terminal is connected to the first secured payment module.

16. The secured payment device according to claim 15, wherein the first secured payment module is provided with a first component, and the mobile terminal is provided with a second component matching the first component;
   wherein when the first component and the second component are engaged, the mobile terminal is connected to the first secured payment module.

17. The secured payment device according to claim 16, wherein the second component is a part of the payment hardware interface.

18. The non-transitory storage medium according to claim 6, wherein the method further comprises:
   if the second detection result shows that the payment hardware interface is controlled by the secured payment device,
   the processor receiving non-transaction information from the mobile terminal through the payment hardware interface;
   the processor determining whether a content of the non-transaction information conforms to a preset security rule through the first secured payment module;
   the processor refusing the payment, if the content of the non-transaction information does not conform to the preset security rule; and
   the processor forwarding the non-transaction information to a third-party server, if the content of the non-transaction information conforms to the preset security rule.

19. The non-transitory storage medium according to claim 6, wherein the processor providing a payment warning comprises at least one of:
   the processor using a display connected to the payment hardware interface to show a payment warning message for indicating a prohibited payment;
   the processor using an indicator light connected to the payment hardware interface to flash; and
   the processor using a buzzier connected to the payment hardware interface to buzz.

20. The non-transitory storage medium according to claim 6, wherein the at least one secured payment module comprises a second secured payment module which does not share a payment hardware interface with the mobile terminal.

* * * * *